(12) United States Patent
Gong

(10) Patent No.: US 10,348,155 B2
(45) Date of Patent: *Jul. 9, 2019

(54) DOUBLE OIL PASSAGE STRUCTURE OF STEERING MOTOR

(71) Applicant: GUANGDONG HUA'CHAN RESEARCH INSTITUTE OF INTELLIGENT TRANSPORTATION SYSTEM CO., LTD, Shenzhen, Guangdong Province (CN)

(72) Inventor: Shugang Gong, Guangdong (CN)

(73) Assignee: GUANGDONG HUA'CHAN RESEARCH INSTITUTE OF INTELLIGENT TRANSPORTATION SYSTEM CO., LTD, Shenzhen, Guangdong Province (CN)

( * ) Notice: Subject to any disclaimer, the term of this patent is extended or adjusted under 35 U.S.C. 154(b) by 212 days.

This patent is subject to a terminal disclaimer.

(21) Appl. No.: 15/300,691

(22) PCT Filed: Apr. 2, 2014

(86) PCT No.: PCT/CN2014/074600
§ 371 (c)(1),
(2) Date: Sep. 29, 2016

(87) PCT Pub. No.: WO2015/149296
PCT Pub. Date: Oct. 8, 2015

(65) Prior Publication Data
US 2017/0110927 A1    Apr. 20, 2017

Related U.S. Application Data

(63) Continuation of application No. PCT/CN2014/074600, filed on Apr. 2, 2014.

(30) Foreign Application Priority Data

Mar. 31, 2014    (WO) ............... PCT/CN2014/074346

(51) Int. Cl.
*H02K 5/24*       (2006.01)
*B62D 5/04*       (2006.01)
(Continued)

(52) U.S. Cl.
CPC ............... *H02K 5/24* (2013.01); *B62D 5/04* (2013.01); *B62D 5/0418* (2013.01); *B62D 7/02* (2013.01);
(Continued)

(58) Field of Classification Search
CPC .. H02K 5/24; H02K 5/04; H02K 5/10; H02K 5/15; H02K 23/04; H02K 19/02;
(Continued)

(56) References Cited

U.S. PATENT DOCUMENTS 2,589,341 A * 3/1952 Chisholm, Jr. ....... B64C 25/505
180/429
3,657,967 A * 4/1972 Suzuki .................... B62D 5/08
91/372
(Continued)

FOREIGN PATENT DOCUMENTS

CN       2742662 Y      11/2005
CN     102144349 A       8/2011
(Continued)

OTHER PUBLICATIONS

International Search Report, dated Nov. 24, 2014, International Patent Application No. PCT/CN2014/074600 with English translation (6 pages).

*Primary Examiner* — Edgardo San Martin
(74) *Attorney, Agent, or Firm* — Hamre, Schumann, Mueller & Larson, P.C.

(57) ABSTRACT

Disclosed is a double oil passage structure of a steering motor, comprising an upper cover buffering assembly (1)
(Continued)

and an oil distributor (2), which are fitted with each other to form an axial cavity (4), wherein an oil flow passage (23), an oil inlet (22) and a hollow column (21) are provided in the oil distributor (2), the oil flow passage (23) being in communication with the axial cavity (4), and an inner wall of the hollow column (21) being provided with an oil flow port in communication with the oil flow passage (23); a directional control valve (3) including a valve core (31) is provided in the hollow column (21), and a first radial cavity is formed between the hollow column (21) and the directional control valve (3) and partitioned by a pin (7) into oil inlet and outlet cavities (24, 25) of the oil distributor which are respectively in communication with the oil inlet (22) and the axial cavity (4); a directional control valve oil flow passage (33) is provided on an upper part of a side wall of a valve cavity (32), and an oil flow hole (34) is provided in a lower part; an annular oil flow groove (35) is provided on an outer wall of the valve core (31), and is in communication with the oil inlet and outlet cavities (24, 25) of the oil distributor; and a second radial cavity (36) is formed by an outer wall of the lower end of the valve core (31) and a side wall of the lower part of the valve cavity (32), and the lower part of the valve cavity (32) is provided with an oil outlet (37) in communication with the second radial cavity (36). The above double oil passage structure partitions the oil passage into two independent branch oil passages, so as to reduce the occupied space and reduce the volume of the motor.

14 Claims, 6 Drawing Sheets

(51) Int. Cl.
| | | |
|---|---|---|
| B62D 7/22 | (2006.01) | |
| H02K 7/16 | (2006.01) | |
| H02K 5/04 | (2006.01) | |
| B62D 7/02 | (2006.01) | |
| H02K 5/00 | (2006.01) | |
| B62D 5/00 | (2006.01) | |
| B62D 7/00 | (2006.01) | |

(52) U.S. Cl.
CPC ............... *B62D 7/22* (2013.01); *H02K 5/04* (2013.01); *H02K 7/16* (2013.01)

(58) Field of Classification Search
CPC .......... H02K 9/22; B62D 5/04; B62D 5/0418; B62D 5/0403; B62D 5/0409; B62D 5/0421; B62D 7/22; F16C 33/78; F16C 33/7816; F16C 33/782
See application file for complete search history.

(56) References Cited

U.S. PATENT DOCUMENTS

| | | | | |
|---|---|---|---|---|
| 4,632,641 | A * | 12/1986 | Liska | B62D 6/00 417/273 |
| 4,699,231 | A * | 10/1987 | Lang | B62D 5/22 180/428 |
| 4,718,514 | A * | 1/1988 | Hirakushi | B62D 6/02 180/422 |
| 5,961,309 | A * | 10/1999 | Harpole | F04C 15/0049 417/540 |
| 7,061,147 | B2 * | 6/2006 | Ries | B63H 5/125 310/51 |
| 2001/0031204 | A1 * | 10/2001 | Oba | F04C 14/226 417/220 |
| 2013/0008759 | A1 * | 1/2013 | Kasuya | B60K 1/00 192/110 B |
| 2013/0249356 | A1 * | 9/2013 | Nakano | H02K 5/24 310/68 D |
| 2015/0357878 | A1 * | 12/2015 | Fukunaga | H02K 3/50 310/71 |
| 2017/0106901 | A1 * | 4/2017 | Gong | B62D 5/062 |
| 2017/0110926 | A1 * | 4/2017 | Gong | H02K 7/14 |
| 2017/0110927 | A1 * | 4/2017 | Gong | H02K 5/24 |
| 2017/0110931 | A1 * | 4/2017 | Gong | H02K 5/24 |
| 2018/0111643 | A1 * | 4/2018 | Kim | B62D 5/0409 |
| 2018/0148091 | A1 * | 5/2018 | Krieger | F16F 15/04 |

FOREIGN PATENT DOCUMENTS

| | | |
|---|---|---|
| CN | 102959838 A | 3/2013 |
| CN | 103291613 A | 9/2013 |

* cited by examiner

DOUBLE OIL PASSAGE STRUCTURE OF STEERING MOTOR

FIELD OF THE INVENTION

The present application relates to the technical field of oil passages of motors, especially to a double oil passage structure of a steering motor.

BACKGROUND OF THE INVENTION

With continuous development of automobile industry, steering systems of automobiles have obtained rapid progresses, and an electric power steering system is the development direction of automobile steering systems. The steering power of the system is directly provided by a steering motor some components required by traditional hydraulic power steering systems are then omitted, and hence not only is energy saved but also the environment is protected. Furthermore, the system further has features that it is easy to be adjusted and flexible to be assembled and the steering power can be provided under various circumstances.

When a driver operates a steering wheel to veer, a torque sensor detects the veer of the steering wheel and the extent of the torque, and transmits a voltage signal to an electronic control unit. The electronic control unit sends an instruction to a steering motor controller according to the torque voltage signal, the steering direction, and the automobile speed signal detected by the torque sensor, and makes the steering motor output a steering power torque with corresponding magnitude and direction, thereby producing auxiliary power. When the automobile does not veer, the electronic control unit will not send any instruction to the motor controller, and the motor does not work.

Existing steering motors are generally provided with a variety of oil passages, such as oil passages for shock absorption oil supply, oil passages for braking oil supply, oil passages for hoist oil supply, etc; however, these oil passages are all designed independently and assembled separately, such that each of the oil passages are isolated from each other; therefore, too many independent oil passages occupy too much internal space of the steering motor, such that the remained available space inside the steering motor is reduced correspondingly. In order to avoid the affect, the whole volume of the steering motor is often increased, which not only wastes resources but also increases manufacturing cost.

SUMMARY OF THE INVENTION

Technical Problems

A purpose of the present application is to provide a double oil passage structure of a steering motor, which aims to overcome the defects in the prior art that each oil passage inside the steering motor is designed independently and hence occupies a relatively large internal space of the steering motor, such that the volume of the steering motor is increased, and thus resources are wasted and manufacturing cost is increased.

Technical Solutions

A technical solution provided by the present application is that: a double oil passage structure of a steering motor includes an upper cover buffering assembly and an oil distributor; the oil distributor is arranged under the upper cover buffering assembly, and is fitted with the upper cover buffering assembly to form a sealed axial cavity; the oil distributor is provided with an oil flow passage arranged radially and in communication with the axial cavity; the oil distributor is provided with an oil inlet; a hollow column that is arranged axially with an inner cavity extends upwards and downwards respectively inside the oil distributor; an inner wall of the hollow column is provided with an oil flow opening in communication the oil flow passage;

an inner side of the hollow column is provided with a reversing valve which has a valve core; an inner sidewall of the hollow column and an outer wall of the reversing cavity form a first radial cavity; the first radial cavity is embedded with a pin; the first radial cavity is separated by the pin to form an oil-distributor oil-inlet cavity and an oil-distributor oil-outlet cavity which are independent from each other; the oil-distributor oil-inlet cavity is in communication with the oil inlet, and the oil-distributor oil-outlet cavity is in communication with the axial cavity;

an upper portion of a sidewall of the valve cavity is provided with a reversing-valve oil-flow passage arranged to penetrate radially, and an axial lower portion of the reversing-valve oil-flow passage is provided with an oil flow hole arranged radially;

an oil-flow ring slot with a semicircle shaped section is arranged around an outer wall of an upper end of the valve core, and the oil-flow ring slot is in communication with the oil-distributor oil-inlet cavity and the oil-distributor oil-outlet cavity;

an outer wall of a lower end of the valve core and a sidewall of a lower portion of the valve cavity form a second radial cavity; a lower portion of the valve cavity is provided with an oil outlet; the oil outlet is in communication with the second radial cavity.

Furthermore, the upper cover buffering assembly includes an upper cover and a butterfly-shaped elastic diaphragm, and the elastic diaphragm is embedded into a lower edge of an inner side of the upper cover and fitted with the oil distributor through a fastener to form a seal.

Preferably, a cylinder assembly is arranged under the oil distributor; the cylinder assembly comprises a cylinder which is abutted against a lower surface of the oil distributor and has openings defined at two ends thereof, an elastic oil bag arranged inside the cylinder and having an upper end connected fixedly, and a piston that is fixedly connected to a lower end of the elastic oil bag and capable of moving axially inside the cylinder.

Furthermore, the upper end of the elastic oil bag is provided with an opening, and an edge of the opening is fixedly connected with the cylinder; the oil distributor is provided with a damp hole which is in communication with the axial cavity and the elastic oil bag respectively.

Furthermore, an aperture of the damping hole is smaller than a caliber of the opening of the upper end of the elastic oil bag.

Preferably, the reversing valve includes a winding coil positioned under the oil distributor and sheathed around a periphery of the valve cavity.

Furthermore, a center of the valve core is provided with a circular through-hole; a plurality of open ring slots are arranged around an outer wall of the valve core; the open ring slots are embedded internally with an O-shaped seal ring.

Furthermore, a bottom end of the valve core is provided with a valve tail, and the valve tail extends downwards to the bottom end of the valve cavity; both an inner wall and an outer wall of the valve tail are provided with open slots; a hollow bellows is embedded inside the open slots; the hollow bellows extends downwards beyond the bottom end of the valve core.

Furthermore, an inner wall of a top end of the hollow column is sheathed with a deep groove ball bearing; a hollow sleeve is sheathed in an inner ring of the deep groove ball bearing; an inner diameter of the hollow sleeve is smaller than an inner diameter of the circular through-hole defined in the valve core.

Furthermore, a pipeline sheath is arranged inside the hollow sleeve; the pipeline sheath extends downwards along the inner wall of the hollow sleeve and beyond the hollow bellows.

Beneficial Effect

Through the cooperation between the valve core of the reversing valve and the axial valve thereof, the double oil passage structure of the steering motor provided by the present application forms an oil passage which starts from the oil distributor into the oil inlet cavity, passes through the oil-flow ring slot on the valve core and the oil-distributor oil-outlet cavity, and enters the axial cavity; and forms another oil passage which starts from oil-distributor oil-inlet cavity, passes through the oil flow hole of the reversing valve, enters the second radial cavity, and is in communication with the oil-outlet passage. By the cooperation between the valve core of the reversing valve and the valve cavity thereof, the passages are divided into two non-interfering branch oil passages, the space occupied by the oil passages is reduced, the volume of the steering motor is further reduced, and resources as well as cost are saved.

DETAILED DESCRIPTION OF THE PREFERRED EMBODIMENT

In order to make the purposes, technical solutions, and advantages of the present application more clear, the present application will be further described in detail hereinafter with reference to accompanying drawings and embodiments. It should be understood that the specific embodiments described herein are merely intended to explain but not to limit the present application.

The implementation of the present application will be described in detail hereinafter with reference to the following specific embodiments.

Figure 1:
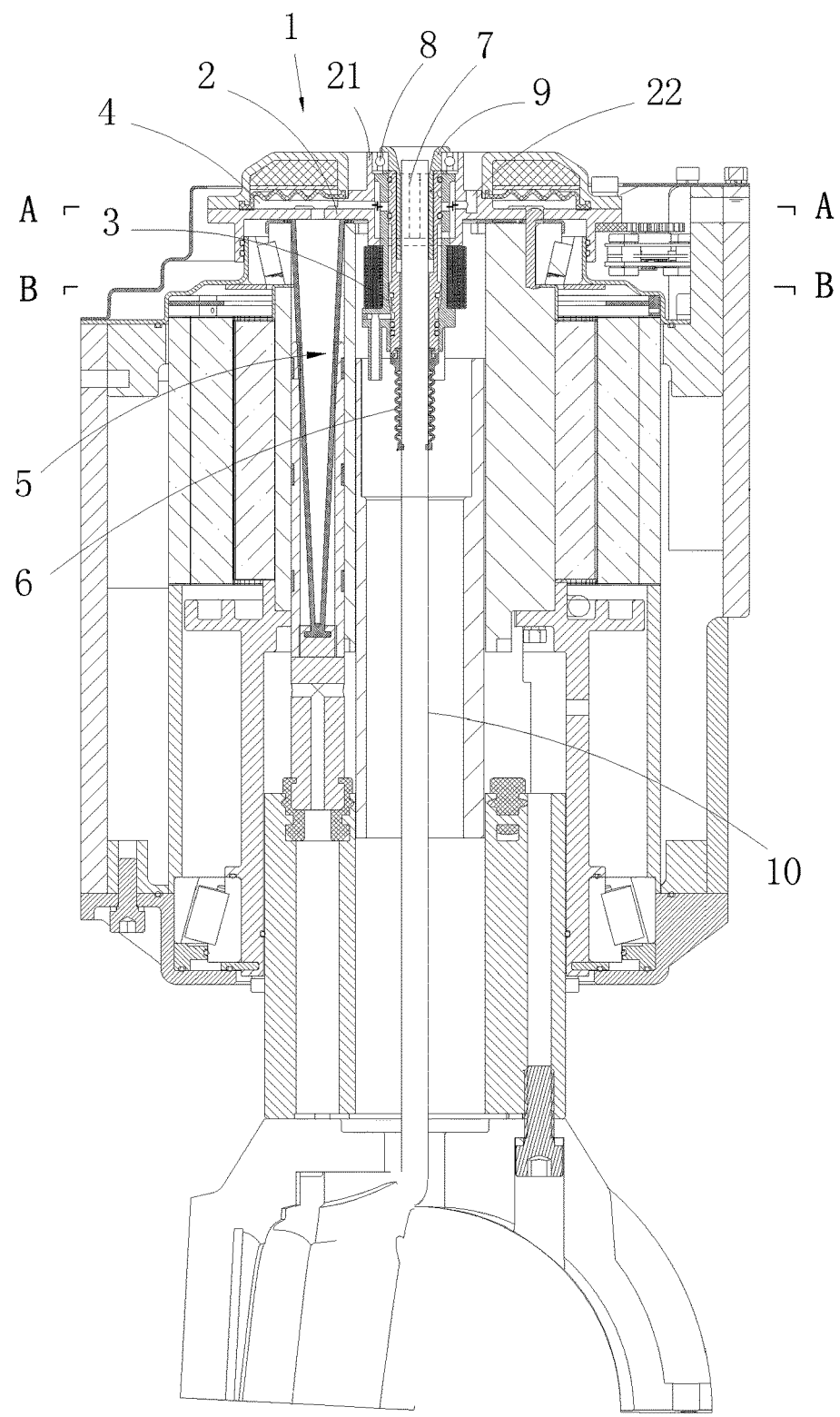
FIG. 1 is a sectional schematic view of a double oil passage structure provided by an embodiment of the present application assembled in a steering motor.
Figure 2:
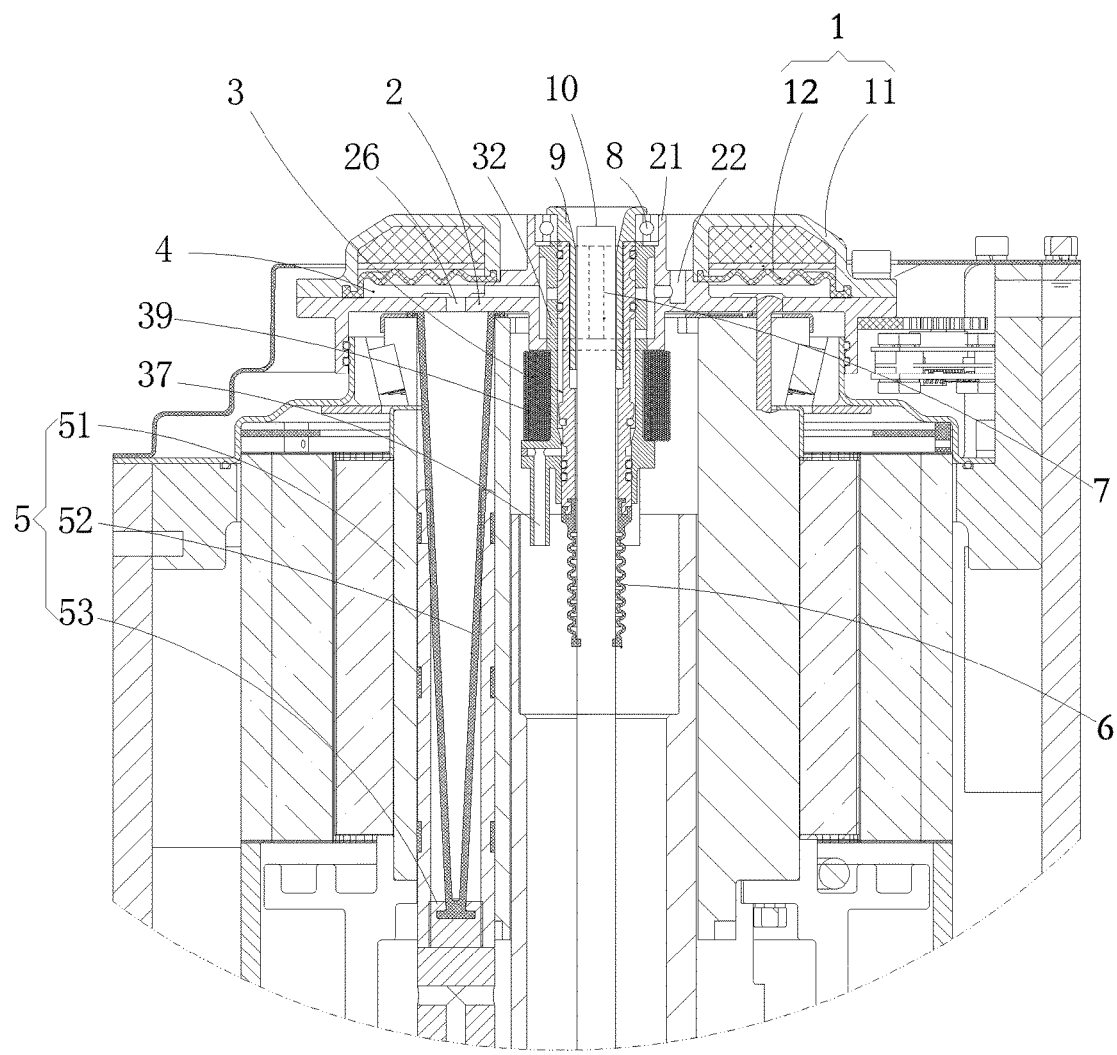
FIG. 2 is a partially enlarged schematic view of FIG. 1.
Figure 3:
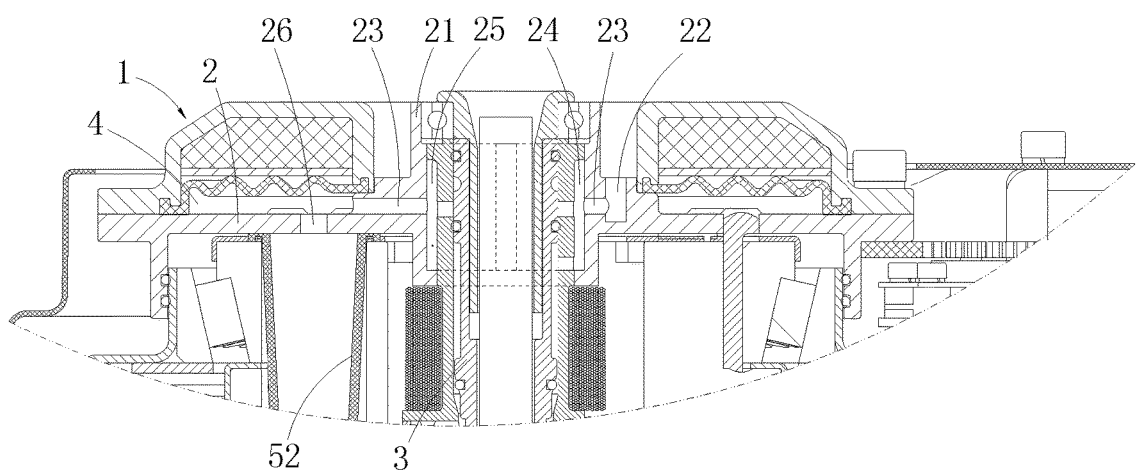
FIG. 3 is a partially enlarged schematic view of an oil distributor portion in FIG. 1.
Figure 4:
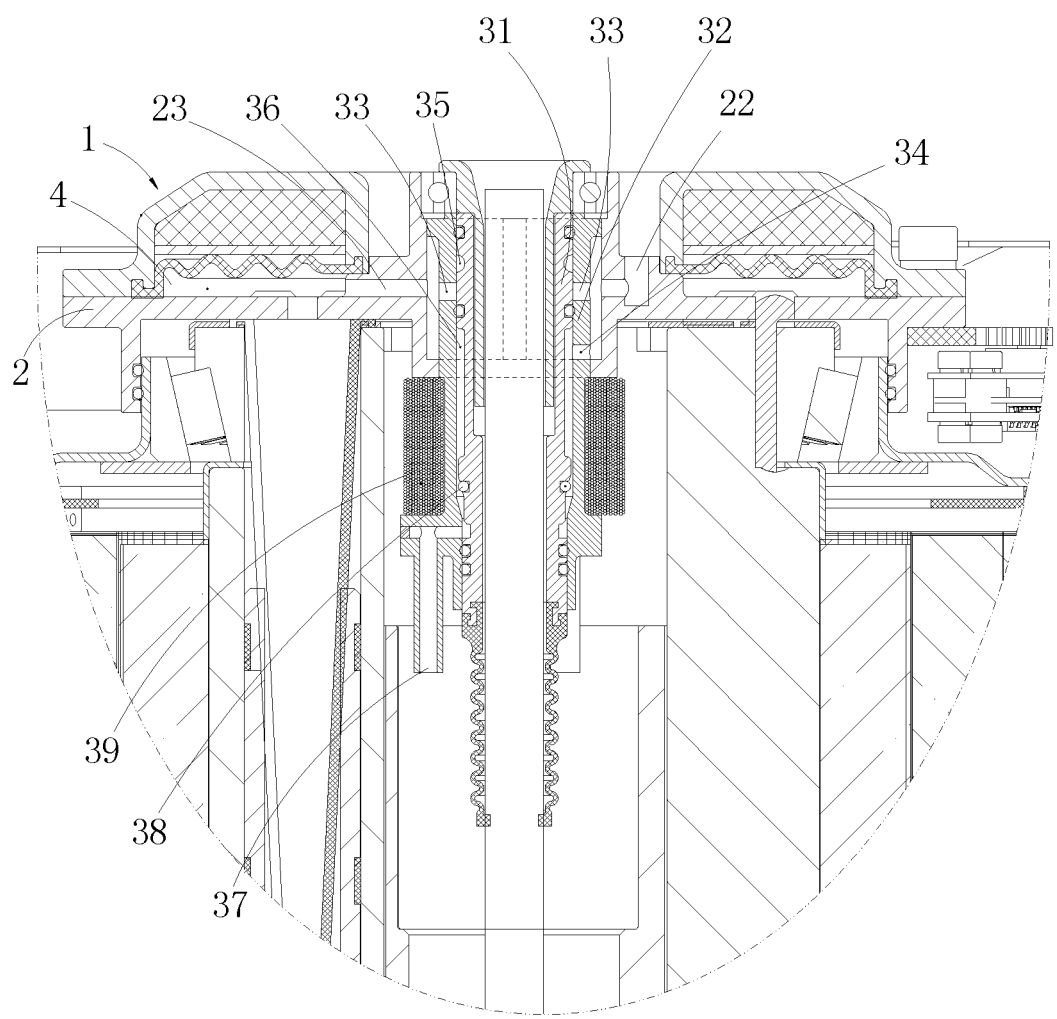
FIG. 4 is a partially enlarged schematic view of a reversing valve portion in FIG. 1.
Figure 5:
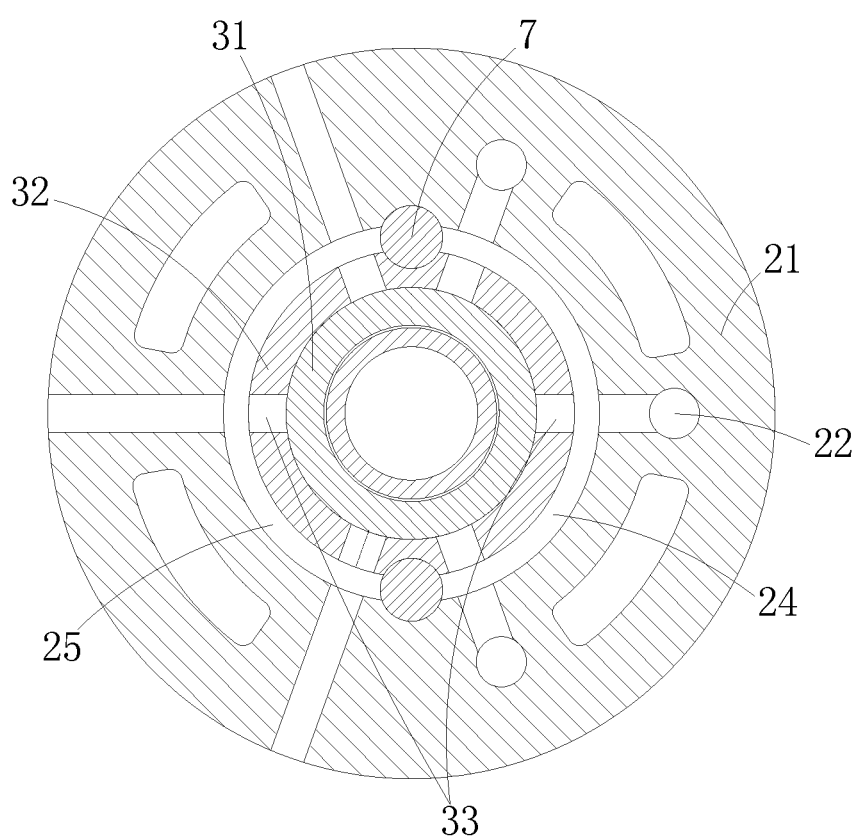
FIG. 5 is a sectional schematic view along the cutting direction A-A of FIG. 1.
Figure 6:
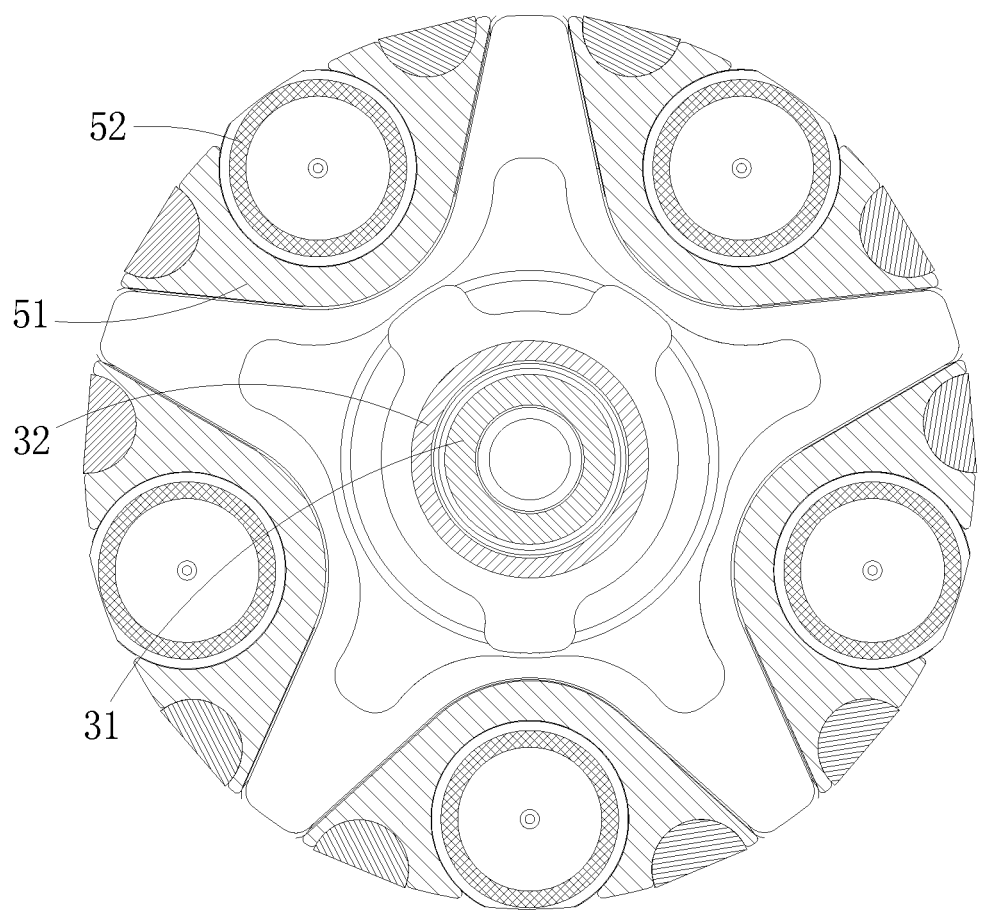
FIG. 6 is a sectional schematic view along the cutting direction B-B of FIG. 1.

As shown in FIGS. 1-6, the present application provides a preferred embodiment.

The embodiment provides a double oil passage structure of a steering motor, and the double oil passage structure is arranged inside the steering motor and includes an upper cover buffering assembly 1 and an oil distributor 2; the oil distributor 2 is arranged under the upper cover buffering assembly 1, and the upper cover buffering assembly 1 and the oil distributor 2 are fitted with each other to form a sealed axial cavity 4; The oil distributor 2 is provided with a hollow column 21 which respectively extends upwards downwards and is arranged axially; the hollow column 21 is provided with an inner cavity. At the same time, the oil distributor 2 is further provided with an oil inlet 22 and an oil flow passage 23 arranged radially. An inner wall of the hollow column 21 is provided with an oil flow opening which is in communication with the oil flow passage 23. The oil flow passage 23 is in communication with an inner cavity of the hollow column 21 through the oil flow opening, and the oil flow passage 23 is further in communication with the axial cavity 4. An inner side of the hollow column 21 is provided with a reversing valve 3, and the reversing valve 3 is provided with a valve core 31 and a valve cavity 32. An inner wall of the hollow column 21 and an outer wall of the valve cavity 32 form a first radial cavity. The first radial cavity is embedded with a pin 7. The first radial cavity is separated by the pin 7 to form an oil-distributor oil-inlet cavity 24 and an oil-distributor oil-outlet cavity 25 which are independent from each other; wherein the oil-distributor oil-inlet cavity 24 is in communication with the oil inlet 22, and the oil-distributor oil-outlet cavity 25 is in communication with the axial cavity 4. An upper portion of a sidewall of the valve cavity 32 is provided with a reversing-valve oil-flow passage 33 arranged to penetrate radially. An axial lower portion of the reversing-valve oil-flow passage 33 is provided with an oil flow hole 34 arranged radially. Furthermore, an oil-flow ring slot 35 with a semicircle shaped section is arranged around an upper portion of an outer wall of the valve core 31; the oil-flow ring slot 35 is respectively in communication with the oil-distributor oil-inlet cavity 24 and the oil-distributor oil-outlet cavity 25. A second radial cavity 36 is formed between an outer wall of a lower end of the valve core 31 and an inner wall of a lower portion of the valve cavity 32. A lower portion of the valve cavity 32 is provided with an oil outlet 37, and the oil outlet 37 is in communication with the second radial cavity 36.

As described above, the oil-distributor oil-inlet cavity 24 is in communication with the reversing-valve oil-flow passage 33, the oil-flow ring slot 35, the oil-distributor oil-outlet cavity 25, and the axial cavity 4 so as to form an oil passage. The oil passage is configured for the oil supply to a steering motor hydraulic damping system and the hoist oil supply. The oil-distributor oil-inlet cavity 24 is in communication with the oil flow hole 34, the second radial cavity 36, and the oil outlet 37 so as to form another oil passage which is configured for the oil supply for steering motor braking. By upward and downward movements of the valve core 31 inside the valve cavity 32, and cooperation among the oil-flow ring slot 35, a plurality of the O-shaped sealing ring 38, and an inner wall of the valve cavity 32, a non-interference switch between the two oil passages can be realized.

Applying the aforesaid double oil passage structure to the steering motor has the following features:

The sealed axial cavity 4 is formed by fitting the upper cover buffering assembly 1 with the oil distributor 2; both the oil-distributor oil-outlet cavity 25 which is in communication with the axial cavity 4 and the reversing-valve oil-flow passage 33 are in communication with the oil-distributor oil-inlet cavity 24 through the oil-flow ring slot 35; the second radial cavity 36 is in communication with the oil flow passage 34, the oil-distributor oil-inlet cavity 24 and the oil outlet 37. By the upward and downward movements of the valve core 31 inside the valve cavity 32, and the cooperation among the oil-flow ring slot 35, the plurality of the O-shaped sealing rings 38, and the inner wall of the valve cavity 32, a non-interfering switch between the aforesaid two oil passages can be realized. This design reduces the space occupied by the two oil passages, and further reduces the volume of the steering motor, and saves resources as well as cost.

In this embodiment, the upper cover buffering assembly 1 includes an upper cover 11 and an elastic diaphragm 12, wherein, the elastic diaphragm 12 is butterfly-shaped. The elastic diaphragm 12 is embedded into a lower margin of the inner side of the upper cover 11 to seal and fasten. The structure of the oil distributor 2 matches with and corresponds to the structure of the upper cover buffering assembly 1; the oil distributor 2 and the upper cover buffering assembly 1 are fitted with each other and connected hermetically through a fastener. Surely, in other embodiments, according to actual conditions and requirements, the upper cover buffering assembly 1 and the oil distributor 2 can also adopt other types of structures.

In the present embodiment, a cylinder assembly 5 is arranged under the oil distributor 2; the cylinder assembly 5 includes a cylinder 51, an elastic oil bag 52 and a piston 53. The cylinder 51 is a hollow columnar structure with openings defined at two ends thereof, and an upper end of the cylinder 51 is abutted against a lower surface of the oil distributor 2; both the elastic oil bag 52 and the piston 53 are arranged in the cylinder 51; the elastic oil bag 52 is a saccular elastic diaphragm with an opening defined at an upper end thereof, and a tail end of the elastic oil bag 52 is fixedly connected with an upper end of the piston 53; the piston 53 is capable of moving axially inside the cylinder 51.

An edge of the opening at the upper end of the elastic oil bag 52 is fixedly connected with an inner wall of the opening at the upper end of the cylinder 51, thereby forming a seal for the opening of the cylinder 51. Furthermore, the opening of the elastic oil bag 52 is hermetically communicated with the axial cavity 4 through the oil distributor 2, thereby forming an oil passage.

An undersurface of the bottom end of the oil distributor 2 is provided with a damping hole 26, and the damping hole 26 is arranged to be aligned with the opening at the upper end of the elastic oil bag 52, in this way, the elastic oil bag 52 is in hermetical communication with the axial cavity 4 through the damping hole 26. Surely, in other embodiments, the elastic oil bag 52 can be in hermetical communication with the axial cavity 4 in other ways, such as a pipe connection or a passage connection, etc.

Furthermore, an aperture of the damping hole 26 is smaller than a caliber of the opening of the elastic oil bag 52. In this way, when the elastic oil bag 52 is compressed by the aforesaid piston 53, the oil fluid inside the elastic oil bag 52 will be squeezed out and flow into the axial cavity 4 through the damping hole 26. The damping hole 26 thus provides a damping buffer function. Surely, this is just one buffering form; in other embodiments, other buffering forms can also be adopted.

In this embodiment, the reversing valve 3 is an electromagnetic reversing valve. The reversing valve 3 further includes a winding coil 39. Specifically, the winding coil 29 is sheathed around an outer wall of the valve cavity 32; the outer wall is provided with an axial locating flange; the winding coil 39 is located below the hollow column 21 and above the locating flange of the outer wall of the valve cavity 32. Surely, in other embodiments, according to actual conditions and requirements, other types of reversing valves can also be adopted.

A center of the valve core 31 is provided with a circular through-hole; a plurality of open ring slots are arranged around an outer wall of the valve core 31; each of the open ring slots is embedded internally with an O-shaped seal ring 38.

In the original state, the oil-flow ring slot 35 and the oil flow passage 23 are staggered; the reversing-valve oil-flow passage 33 is blocked by an outer wall of the valve core 31. At this time, the second radial cavity 36 is in communication with the oil-distributor oil-inlet cavity 24 through the oil flow hole 34, that is, an oil passage formed by the oil-distributor oil-inlet cavity 24 and the second radial cavity 36 forms a clear passage, and an oil passage formed by the oil-distributor oil-inlet cavity 24, the axial cavity 4 and the elastic oil bag 52 is blocked. When the winding coil 39 is electrified, the whole valve core 31 moves down, the oil-flow ring slot 35 is aligned with and in communication with the oil flow passage 33; the O-shaped seal ring 38 at a lower cone of the valve core 31 compresses a circular cone at the bottom of the valve core 32, that is, the second radial cavity 36 is blocked. In this way, the oil passage formed by the oil-distributor oil-inlet cavity 24, the axial cavity 4 and the elastic oil bag 52 forms a clear passage. At the same time, the oil passage formed by the oil-distributor oil-inlet cavity 24 and the second radial cavity 36 is blocked. The reversing and switch function of the reversing valve 3 achieves a switch between the two oil passages, without interference.

In this present embodiment, the bottom end of the valve core 31 is provided with a valve tail, and the valve tail extends downwards beyond the bottom end of the valve cavity 32; both an inner wall and an outer wall of the valve tail are provided with open slots which each penetrate in a circumferential direction. A hollow bellows 6 is embedded inside each open slot; the hollow bellows 6 extends downwards beyond the bottom end of the valve core 31.

A top end of an inner wall of the hollow column 21 is sheathed around a deep groove ball bearing 8. A hollow sleeve 9 is sheathed in an inner ring of the deep groove ball bearing 8. The valve core 31 is provided with a circular through-hole penetrating the valve core 31 from top to bottom. An inner diameter of the hollow sleeve 9 is smaller than an inner diameter of the circular through-hole. In other embodiments, the top end of the inner wall of the hollow column 21 can also be sheathed around other types of bearings.

Specifically, a pipeline sheath 10 is arranged inside the hollow sleeve 9. The pipeline sheath 10 extends downwards along the inner wall of the hollow sleeve 9 and beyond the bottom end of the valve core 31, and further enters the hollow bellows 6. The hollow bellows 6 and the hollow sleeve 9 support and locate the pipeline sheath 10. In this embodiment, the pipeline sheath 10 is configured to be sheathed around a hand brake stayguy. Surely, in other embodiments, the arrangement of the hand brake stayguy can also adopts other methods, and the pipeline sheath 10 can also be configured to arrange other pipelines.

The above contents are only preferred embodiments of the present invention, and are not intended to limit the present invention. Any improvements, equivalent replacements and modifications made within the spirit and principle of the present invention should be contained within the protection scope of the present invention.

What is claimed is:

1. A double oil passage structure of a steering motor, wherein the double oil passage structure comprises an upper cover buffering assembly and an oil distributor; the oil distributor is arranged under the upper cover buffering assembly, and is fitted with the upper cover buffering assembly to form a sealed axial cavity; the oil distributor is provided with an oil flow passage arranged radially and in communication with the axial cavity; the oil distributor is provided with an oil inlet; a hollow column that is arranged axially with an inner cavity extends upwards and downwards respectively inside the oil distributor; an inner wall of the hollow column is provided with an oil flow opening in communication the oil flow passage;

an inner side of the hollow column is provided with a reversing valve which has a valve core; an inner sidewall of the hollow column and an outer wall of the reversing cavity form a first radial cavity; the first radial cavity is embedded with a pin; the first radial cavity is separated by the pin to form an oil-distributor oil-inlet cavity and an oil-distributor oil-outlet cavity which are independent from each other; the oil-distributor oil-inlet cavity is in communication with the oil inlet, and the oil-distributor oil-outlet cavity is in communication with the axial cavity;

an upper portion of a sidewall of the valve cavity is provided with a reversing-valve oil-flow passage arranged to penetrate radially, and an axial lower portion of the reversing-valve oil-flow passage is provided with an oil flow hole arranged radially;

an oil-flow ring slot with a semicircle shaped section is arranged around an outer wall of an upper end of the valve core, and the oil-flow ring slot is in communication with the oil-distributor oil-inlet cavity and the oil-distributor oil-outlet cavity;

an outer wall of a lower end of the valve core and a sidewall of a lower portion of the valve cavity form a second radial cavity; a lower portion of the valve cavity is provided with an oil outlet; the oil outlet is in communication with the second radial cavity.

2. The double oil passage structure of a steering motor of claim 1, wherein the upper cover buffering assembly comprises an upper cover and a butterfly-shaped elastic diaphragm, and the elastic diaphragm is embedded into a lower edge of an inner side of the upper cover and fitted with the oil distributor through a fastener to form a seal.

3. The double oil passage structure of a steering motor of claim 1, wherein a cylinder assembly is arranged under the oil distributor; the cylinder assembly comprises a cylinder which is abutted against a lower surface of the oil distributor and has openings defined at two ends thereof, an elastic oil bag arranged inside the cylinder and having an upper end connected fixedly, and a piston that is fixedly connected to a lower end of the elastic oil bag and capable of moving axially inside the cylinder.

4. The double oil passage structure of a steering motor of claim 3, wherein the upper end of the elastic oil bag is provided with an opening, and an edge of the opening is fixedly connected with the cylinder; the oil distributor is provided with a damp hole which is in communication with the axial cavity and the elastic oil bag respectively.

5. The double oil passage structure of a steering motor of claim 4, wherein an aperture of the damping hole is smaller than a caliber of the opening of the upper end of the elastic oil bag.

6. The double oil passage structure of a steering motor of claim 1, wherein the reversing valve includes a winding coil positioned under the oil distributor and sheathed around a periphery of the valve cavity.

7. The double oil passage structure of a steering motor of claim 6, wherein a center of the valve core is provided with a circular through-hole; a plurality of open ring slots are arranged around an outer wall of the valve core; the open ring slots are embedded internally with an O-shaped seal ring.

8. The double oil passage structure of a steering motor of claim 6, wherein a bottom end of the valve core is provided with a valve tail, and the valve tail extends downwards to the bottom end of the valve cavity; both an inner wall and an outer wall of the valve tail are provided with open slots; a hollow bellows is embedded inside the open slots; the hollow bellows extends downwards beyond the bottom end of the valve core.

9. The double oil passage structure of a steering motor of claim 8, wherein an inner wall of a top end of the hollow column is sheathed with a deep groove ball bearing; a hollow sleeve is sheathed in an inner ring of the deep groove ball bearing; an inner diameter of the hollow sleeve is smaller than an inner diameter of the circular through-hole defined in the valve core.

10. The double oil passage structure of a steering motor of claim 9, wherein a pipeline sheath is arranged inside the hollow sleeve; the pipeline sheath extends downwards along an inner wall of the hollow sleeve and beyond the hollow bellows.

11. The double oil passage structure of a steering motor of claim 2, wherein the reversing valve includes a winding coil positioned under the oil distributor and sheathed around a periphery of the valve cavity.

12. The double oil passage structure of a steering motor of-claim 3, wherein the reversing valve includes a winding coil positioned under the oil distributor and sheathed around a periphery of the valve cavity.

13. The double oil passage structure of a steering motor of-claim 4, wherein the reversing valve includes a winding coil positioned under the oil distributor and sheathed around a periphery of the valve cavity.

14. The double oil passage structure of a steering motor of-claim 5, wherein the reversing valve includes a winding coil positioned under the oil distributor and sheathed around a periphery of the valve cavity.

* * * * *